April 20, 1943.                R. L. WILCOX                2,317,320
                          CHIP CONTROL MECHANISM
                           Filed May 18, 1942
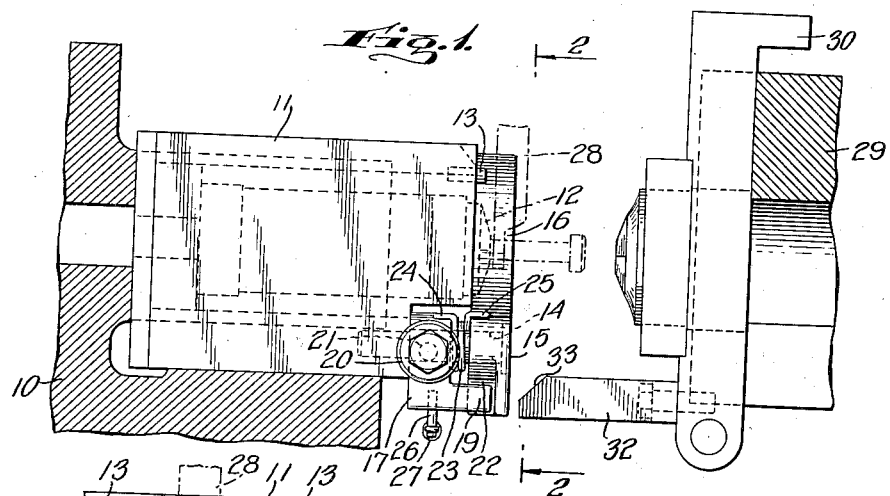
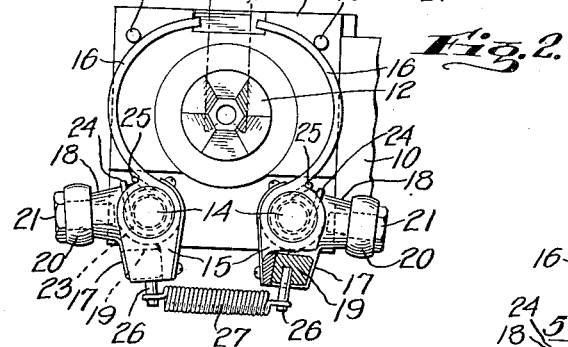
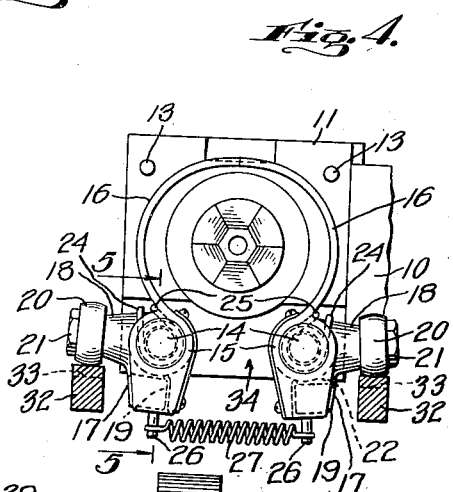
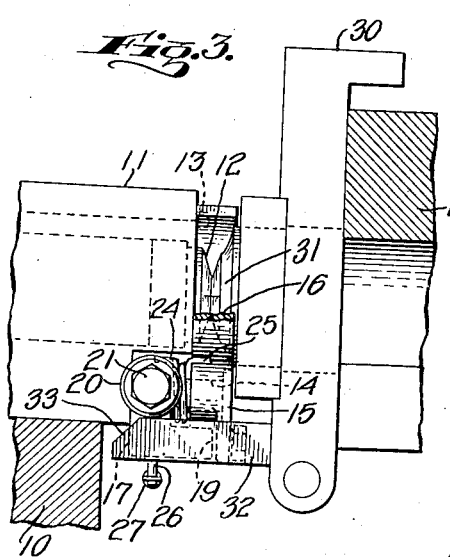
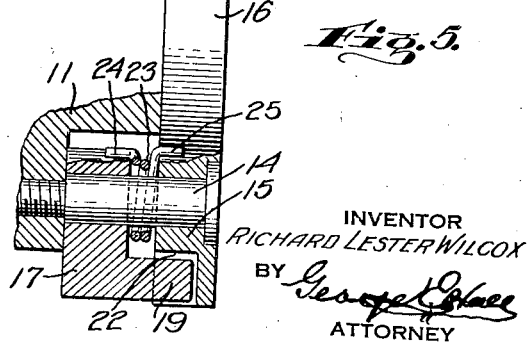
INVENTOR
RICHARD LESTER WILCOX
BY George Cohee
ATTORNEY Patented Apr. 20, 1943

2,317,320

UNITED STATES PATENT OFFICE 2,317,320

CHIP CONTROL MECHANISM

Richard Lester Wilcox, Waterbury, Conn., assignor to The Waterbury Farrel Foundry and Machine Company, Waterbury, Conn., a corporation of Connecticut Application May 18, 1942, Serial No. 443,406

18 Claims. (Cl. 10—24)

This invention relates to new and useful improvements in chip control mechanism.

The principal object of the invention is to provide mechanism that will limit the flight of chips cut from a workpiece to a confined chamber open at the lower side, toward which the chips are directed for escape by gravitational movement into a stream of chips that accumulate in a convenient receptacle; a further object being to move this chip control mechanism into and out of a position relative to the cutting tools and thereby permit the feed of workpieces to such tools without forming an obstruction thereto. Other objects will become apparent from the following description and the accompanying drawing.

Referring to the drawing, in which like numerals of reference indicate like parts in the several figures;

Figure 1 is a side elevation of a die block and punch holder assembled with trimmer tools or the like, and the gate with the trimming die assembled therewith;

Figure 2 is a front elevation of the die block and the chip arms in their open position, looking toward the direction of line 2—2 of Figure 1;

Figure 3 is a fragmentary portion of the parts as shown in Figure 1 with the trimming tools adjacent to each other;

Figure 4 is an elevation similar to Figure 2 with the chip arms in their closed positions; and Figure 5 is an enlarged sectional elevation of a portion of a chip arm and associated rock arm, the parts in section being taken generally upon line 5—5 of Figure 4.

In chip control mechanisms heretofore constructed the guard or similar part that provides the confining walls for the chips is fixed with respect to the cutting tool and necessarily must project beyond the face of the cutting tool with which it is secured.

With some types of trimmers such a chip control mechanism is an obstruction to the feed of workpieces to the cutting tools. This difficulty is overcome in this invention by providing a chip control member that includes parts that move with respect to the cutting tools. In one of their retracted positions they are out of the path of the workpiece as fed to the cutting tools. When feed mechanism has presented the workpiece to the cutting tool and is withdrawn therefrom, the chip control member parts are moved into a position where they partially surround the edges of the cutting tool or tools. In these and other ways the chip control mechanism herein disclosed is adapted for a much wider use under more varied conditions than is the type wherein the chip control mechanism is secured in a permanent position relative to one of the cutting tools.

In the drawing 10 designates the frame of a trimming machine or the like, to which is fixed a die block 11 having a die 12 held therein by any convenient means and two stop pins 13. In the die block, upon opposite sides of the center thereof, are the studs 14, upon which are journaled the chip members 15, having substantially semi-circular chip arms or guard walls 16 forming part thereof, which are substantially parallel with the face of the die block and move thereacross between their open and closed positions and vice versa. While the chip arms or guard walls are described as semi-circular they are not limited to such shape as other forms or shapes of arms or walls that limit the flight of the chips and deflect them toward an escape outlet will function equally as well.

Journaled upon the studs 14, between the chip members 15 and the die block 11, is a guard or rock member 17 having two arms 18 and 19. Upon a stud 21 in the arm 18 is a cam roll 20. The arm 19 projects into a pocket 22 in the chip member 15 and engages one wall thereof, substantially as shown in Figure 5.

Encircling each of the studs 14 is a coil spring 23, having oppositely turned end portions 24 and 25, the former of which exerts pressure upon the rock member 17 and the latter on the chip members 15 to hold the chip members 15 constantly against the wall of the pocket 22. As a result of this structure the rock member 17 and the chip members 15 oscillate as a unit on the stud 14, or independently as occasion demands.

In each rock member 17 is a pin 26. These pins are connected by a coil spring 27, which tends to oscillate the rock members 17, carrying with it the chip members 15 and chip arms 16 to their open position, substantially as shown in Figure 2, when they are in engagement with the stop pins 13. As so positioned, there is an open space between the upper ends of the chip arms sufficient in width to permit a feed finger 28 to pass therebetween and carry a blank to the trimming tools.

The numerals 29 designate the gate of the trimmer, which has a reciprocating movement toward and away from the die 12, and mounted thereon is a plate 30, to which is secured a trimming die 31, the axis of which is in alignment with that of the die 12. Also secured to this gate are the cam pieces 32, each having an inclined cam face 33.

As the gate moves toward the die 12 the cam faces engage the cam rolls 20 and oscillate the rock member 17, moving the chip arms 16 toward each other so that the open space between the upper ends thereof is closed, substantially as shown in Figure 4, but with an opening 34 between the rock members, through which the chips will drop after striking the inner faces of the chip arms 16 and being deflected downwardly.

In case of an obstruction or interference by any means, that would prevent the closing of the chip arms 16, the coil spring 23 will yield and permit the chip arms to remain temporarily in their, obstructed position, thus obviating the possibility of any damage or injury thereto or to other parts.

With the chip control mechanism as disclosed herein, full advantage of a chip guard is obtained without interfering with the transfer of workpieces from a hopper or similar mechanism to the trimming tools.

Within the scope of the appended claims changes and alterations may be made within the spirit of the invention.

What is claimed is:

1. In mechanism for trimming a workpiece by cutting one or more chips therefrom, having substantially co-axial trimming members with an open space therearound, which includes in part plural members which limit the flight of chips from the tools, each member being mounted to move relatively to the trimming members and whereby they may be moved toward and away from the point of cutting and thereby limit the area of said open space, said members being spaced to provide an outlet for the chips below the point of trimming, whereby the same will escape by gravitational movement through the outlet.

2. A mechanism for trimming a workpiece by cutting one or more chips therefrom, having substantially co-axial trimming tools with an open space therearound, which include in part plural members which limit the flight of chips from the tools, each of the members being movably mounted upon a part that is fixed relative to one of the trimming tools and movable relatively to each other, that extend about the point of cutting and limit the area of said open space and spaced to provide an outlet for the chips below the point of trimming, whereby to provide for gravitational movement of the chips through the outlet.

3. A mechanism for trimming a workpiece, including trimming members with an open space therearound; and means for transferring workpieces into line therewith, one of said trimming members having movement toward and away from the other member; the combination therewith of guard members mounted upon a part fixed relatively to one of the trimming members, a chip deflector member on each guard member which moves toward and away from one trimming member, thereby varying the area of said open space and in one position forming a closed wall surrounding a portion of the trimming member; and means associated with another trimming member for actuating said guard members.

4. A mechanism for trimming a workpiece, including trimming members with an open space therearound; and means for transferring workpieces into line therewith, one of said trimming members having movement toward and away from the other member; the combination therewith of guard members mounted upon a part fixed relatively to one of the trimming members, a chip deflector member on each guard member which moves toward and away from one trimming member, thereby varying the area of said open space and in one position forming a closed wall surrounding a portion of the trimming member; means associated with another trimming member for actuating said guard members in one direction; and other means for actuating said guard members in the opposite direction.

5. The combination with trimming tools, one of which is moved toward and away from the other tool; of a block or the like, in which one trimming tool is mounted; guard members on the block or the like below the trimming tool, one guard member being upon each of the opposite sides of the center of the trimming tool; a guard wall member mounted to move about the axis of each guard member; a connection between each guard member and the guard wall member adjacent thereto, whereby it will move therewith and independently thereof, and means for actuating the guard members to move said guard wall members toward each other.

6. The combination with trimming tools, one of which is moved toward and away from the other tool; of a block or the like, in which one trimming tool is mounted; guard members on the block or the like below the trimming tool, one guard member being upon each of the opposite sides of the center of the trimming tool; a guard wall member mounted to move about the axis of each guard member; a flexible connection between each guard member and the guard wall member adjacent thereto, whereby it will move therewith and independently thereof, and means for actuating the guard members to move said guard wall members toward each other.

7. The combination with trimming tools, one of which is moved toward and away from the other tool; of a bloc or the like, in which one trimming tool is mounted; guard members on the block or the like below the trimming tool, one guard member being upon each of the opposite sides of the center of the trimming tool; a guard wall member mounted to move about the axis of each guard member; a connection between each guard member and the guard member adjacent thereto, whereby it will move therewith and independently thereof, and means, in part associated with the trimming tool that moves toward and away from the other tool, for actuating said guard members to move said guard wall members toward each other.

8. The combination with trimming tools, one of which is moved toward and away from the other tool; of a block or the like, in which one trimming tool is mounted; guard members on the block or the like below the trimming tool, one guard member being upon each of the opposite sides of the center of the trimming tool; a guard wall member mounted to move about the axis of each guard member; a connection between each guard member and the guard wall member adjacent thereto, whereby it will move therewith and independently thereof; means for actuating said guard members to move said guard wall members toward each other; and a cam member associated with the last mentioned tool movable into a part on each guard member and imparting movement thereto.

9. The combination with trimming tools, one of which is moved toward and away from the other tool; of a block or the like, in which one trimming tool is mounted; guard members on the block or the like below the trimming tool, one guard member being upon each of the opposite sides of the center of the trimming tool; a guard wall member mounted to move about the axis of each guard member; a connection between each guard member and the guard wall member adjacent thereto, whereby it will move therewith and independently thereof; means for actuating the guard members to move said guard wall members toward each other; and means between the guard members and oscillating the same in one direction and thereby moving the guard wall members away from each other.

10. In combination with a trimming tool; oscillating elements mounted on a fixed part upon opposite sides of the trimming tool, each element having two arms, a roll on one arm, a guard wall member journaled adjacent to each of said elements, and a spring connection between the elements and the adjacent guard wall member.

11. In combination with a trimming tool; oscillating elements mounted on a fixed part below and upon opposite sides of the trimming tool, each element having two arms, a roll on one of the arms, a guard wall member journaled adjacent to each of said elements, a spring connection between the elements and the adjacent guard wall member, a second trimming tool movable toward and away from the first mentioned trimming tool, and cam members associated therewith that engage said rolls and oscillate said elements while moving in one direction.

12. In combination with a trimming tool; oscillating elements mounted upon opposite sides of the trimming tool; a guard wall member journaled adjacent to each of said elements; and spring means for maintaining a yielding connection between the elements and guard wall members.

13. In combination with companion trimming tools; a holder for each of the trimming tools; a plural member guard movably mounted upon the holder for one of the trimming tools that limits the flight of chips away from the trimming tools, in part surrounding the tools, that opens and closes toward and away from the tools and when closed is spaced therefrom; and means, independent of the holder having the plural member guard thereon, for closing the members of the guard in timed relation with the action of the trimming tools.

14. In combination with substantially co-axial tools which cooperate to cut one or more chips from a workpiece, one tool moving toward the other tool and at the point of severance of the chips, having an open space therearound; means for controlling the movement of said chips comprising plural guard members movably supported adjacent to one of the tools, having a guard wall connected therewith; means connected with the movable tool to actuate the guard members, whereby the guard walls will move toward the tools and thereby vary the area of said open space and in one of their positions the guard walls forming a chip deflecting wall around the tools at said point of severance, that portion of the space not enclosed being below the point of severance.

15. In combination with substantially co-axial tools which cooperate to cut one or more chips from a workpiece, one tool moving toward the other tool and at the point of severance of the chips having an open space therearound; means for controlling the movement of said chips, comprising plural guard members movably supported adjacent to one of the tools, having a guard wall connected therewith; means connected with the movable tool to actuate the guard members, whereby the guard walls will move toward the tools and thereby vary the area of said open space and in one of their positions the guard walls forming a chip deflecting wall around the tools at said point of severance, that portion of the space not enclosed being below the point of severance; and independent means for actuating the guard members to move the guard walls away from the tools.

16. In mechanism of the character described; a tool holder; a trimming tool therein; companion guard members, having guard walls connected therewith and movably mounted upon said tool holder; one guard member upon each side of the trimming tool; and means for actuating said guard members to move across the face of the holder toward each other and when in their closed position partly surrounding the trimming tool with an open space therebetween, that portion of the trimming tool not surrounded being therebelow.

17. In mechanism of the character described; a tool holder; a trimming tool therein; companion guard members, having guard walls connected therewith and movably mounted upon said tool holder; one guard member upon each side of the trimming tool; and means for actuating said guard members to move across the face of the holder toward each other and when in their closed position partly surrounding the trimming tool with an open space therebetween, that portion of the trimming tool not surrounded being therebelow, the means for actuating the guard members permitting the same to yield if an obstruction should interfere with the normal movement thereof.

18. In mechanism of the character described; a die block; companion guard members movably mounted thereon; a trimming tool in the die block between the companion guard members; a gate; a tool holder thereon; a trimming tool in the tool holder; and means associated with the tool holder that during its movement in one direction actuates the guard members, whereby they move toward each other and partly surround the trimming tools at the point of severance of chips from a workpiece.

RICHARD LESTER WILCOX.